(12) United States Patent
Carpenter et al.

(10) Patent No.: US 11,125,169 B2
(45) Date of Patent: Sep. 21, 2021

(54) FUEL SYSTEM FOR HEAT ENGINE

(71) Applicant: General Electric Company, Schenectady, NY (US)

(72) Inventors: R. Sheldon Carpenter, Hamilton, OH (US); Manxue Lu, Swampscott, MA (US); William James Mailander, Beverly, MA (US); David Anthony Moster, Liberty Township, OH (US); Guoxin Li, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 16/225,457

(22) Filed: Dec. 19, 2018

(65) Prior Publication Data
US 2020/0200098 A1 Jun. 25, 2020

(51) Int. Cl.
*F02C 9/28* (2006.01)
*F02C 9/26* (2006.01)
(Continued)

(52) U.S. Cl.
CPC .............. *F02C 9/263* (2013.01); *F02C 7/232* (2013.01); *F02C 9/266* (2013.01); *F02C 9/28* (2013.01); *F02C 9/32* (2013.01); *F05D 2220/32* (2013.01)

(58) Field of Classification Search
CPC .... F02C 9/263; F02C 9/32; F02C 9/26; F02C 9/28; F02C 7/232
See application file for complete search history.

(56) References Cited

U.S. PATENT DOCUMENTS 2,835,323 A   5/1958   Booth
3,243,955 A * 4/1966   Frank ...................... F02K 3/10
                                                    60/243
(Continued)

FOREIGN PATENT DOCUMENTS

EP          3109442         12/2016

OTHER PUBLICATIONS

European Patent Office, "Extended European Search Report," issued in connection with EP patent application No. 19215406.0, dated May 15, 2020, 6 pages.

*Primary Examiner* — Todd E Manahan
*Assistant Examiner* — Thuyhang N Nguyen
(74) *Attorney, Agent, or Firm* — Hanley, Flight & Zimmerman, LLC

(57) ABSTRACT

A fuel metering system for a combustion section of a turbo machine is provided. The turbo machine includes a main fuel line configured to provide a flow of fuel and a zone fuel line split from the main fuel line through which at least a portion of the flow of fuel is provided. A fuel valve is disposed at the zone fuel line and is configured to obtain and receive a present fuel valve area value and a present valve position value. A first pressure sensor is disposed upstream of the fuel valve, in which the first pressure sensor is configured to obtain a first pressure value. A second pressure sensor is disposed downstream of the fuel valve, in which the second pressure sensor is configured to obtain a second pressure value. A flow meter is disposed downstream of the fuel valve. A controller is configured to perform operations, in which the operations include determining a demanded fuel valve actuator position based at least on an estimated fuel valve actuator position and a demanded fuel flow; comparing the demanded fuel flow and a present fuel flow; determining an actual fuel valve actuator position based at least on the demanded fuel valve actuator position and the (Continued)

compared demanded fuel flow and present fuel flow; and generating an valve effective area at the fuel valve based at least on the actual fuel valve actuator position.

20 Claims, 8 Drawing Sheets

(51) Int. Cl.
*F02C 7/232* (2006.01)
*F02C 9/32* (2006.01)

(56) References Cited

U.S. PATENT DOCUMENTS

| | | | |
|---|---|---|---|
| 3,771,314 | A | 11/1973 | Rose, Jr. et al. |
| 4,397,148 | A | 8/1983 | Stockton et al. |
| 4,607,486 | A | 8/1986 | Cole |
| 4,645,450 | A | 2/1987 | West |
| 4,794,755 | A | 1/1989 | Hutto, Jr. et al. |
| 5,115,635 | A * | 5/1992 | Jennings .................. F02C 9/26 60/39.281 |
| 5,423,175 | A | 6/1995 | Beebe et al. |
| 5,533,329 | A | 7/1996 | Ohyama et al. |
| 5,833,765 | A | 11/1998 | Flynn et al. |
| 6,328,056 | B1 | 12/2001 | Kumar et al. |
| 7,600,417 | B2 | 10/2009 | Paradise |
| 7,887,302 | B2 | 2/2011 | Hutto, Jr. |
| 8,302,406 | B2 | 11/2012 | Baker |
| 8,776,529 | B2 | 7/2014 | Paradise |
| 8,951,021 | B2 | 2/2015 | Hutto, Jr. |
| 9,926,803 | B2 * | 3/2018 | Britt ........................ F01D 17/14 |
| 2003/0192300 | A1* | 10/2003 | Mahoney ................ F02C 9/263 60/39.281 |
| 2010/0089025 | A1 | 4/2010 | Baker |
| 2010/0332105 | A1 | 12/2010 | Jerrell et al. |
| 2011/0162724 | A1 | 7/2011 | Kleckler |
| 2012/0234014 | A1 | 9/2012 | Reuter et al. |
| 2012/0234015 | A1 | 9/2012 | Reuter |
| 2012/0271527 | A1 | 10/2012 | Zebrowski et al. |
| 2014/0290262 | A1 | 10/2014 | Holcomb et al. |
| 2015/0184594 | A1 | 7/2015 | Stammen et al. |
| 2015/0354466 | A1* | 12/2015 | Higashi .................... F02C 9/40 60/776 |
| 2016/0186670 | A1 | 6/2016 | Oba |
| 2016/0320061 | A1 | 11/2016 | Holcomb et al. |
| 2017/0009666 | A1* | 1/2017 | Cano Wolff .............. F17D 1/04 |
| 2017/0241337 | A1 | 8/2017 | Mokheimer et al. |

\* cited by examiner

FUEL SYSTEM FOR HEAT ENGINE

FIELD

The present subject matter relates generally to fuel systems for heat engines. The present subject matter relates more specifically to fuel system controls for turbine engines.

BACKGROUND

Heat engines, such as gas turbine engines, often require high accuracy control of multiple fuel zones and high fuel delivery pressures. Known fuel metering systems generally include head regulators, bypass valves and controls, and throttling valves for controlling and delivering fuel to multiple fuel zones of the combustor with accuracy to avoid some operability issues, lean blow out, and efficiency. However, such known systems include significant mechanical complexity when scaled up from a single fuel zone to multiple fuel zones, or from two or three fuel zones to additional zones. As such, application of known fuel metering systems generally limits a quantity of fuel zones operable at the engine, as additional zones may induce system weight, complexity, and control inefficiencies greater than the benefits of the additional fuel zones.

Known multi-zone fuel metering systems include valves that split fuel across several fuel lines but often yield low accuracy control and therefore provide insufficient accuracy for modern heat engines (e.g., insufficient for decreased emissions, lean blow out margin, combustion stability, performance, and efficiency, etc.). One known method of fuel splitting includes series splitting of fuel downstream of a total flow meter. However, such a known method cascades or collects fuel valves between the total flow meter and the fuel nozzles, thereby increasing pressure losses and creating dynamic pressure interactions that that may produce system dynamic stability issues (e.g., contributes to undesired combustion dynamics, blow out, combustion stability and performance issues, etc.). Still further, known fuel metering systems increase the total pressure drop in the fuel system, thereby increasing maximum system pressure, which increases fuel pump power requirements and thereby increases engine losses and decreases thermal efficiency.

Known multi-zone fuel metering systems and methods including series splitting may further require maintenance of certain pressure relationships between manifolds (e.g., main fuel line and split zone fuel lines, between each zone fuel line, etc.) for various fuel zones. This inherently induces compromises such as limiting combustor fueling flexibility (e.g., combustor fuel pressures, flow rates, pressure or flow differentials between fuel zones, etc.). Therefore, added mechanical fuel metering system complexity may be necessary to resolve such issues.

As such, there is a need for a fuel metering system that addresses these issues and complexities.

BRIEF DESCRIPTION

Aspects and advantages of the invention will be set forth in part in the following description, or may be obvious from the description, or may be learned through practice of the invention.

An aspect of the present disclosure is directed to a fuel metering system for a combustion section of a turbo machine. The turbo machine includes a main fuel line configured to provide a flow of fuel and a zone fuel line split from the main fuel line through which at least a portion of the flow of fuel is provided. A fuel valve is disposed at the zone fuel line and is configured to obtain and receive a present fuel valve area value and a present valve position value. A first pressure sensor is disposed upstream of the fuel valve, in which the first pressure sensor is configured to obtain a first pressure value. A second pressure sensor is disposed downstream of the fuel valve, in which the second pressure sensor is configured to obtain a second pressure value. A flow meter is disposed downstream of the fuel valve. A controller is configured to perform operations, in which the operations include determining a demanded fuel valve actuator position based at least on an estimated fuel valve actuator position and a demanded fuel flow; comparing the demanded fuel flow and a present fuel flow; determining an actual fuel valve actuator position based at least on the demanded fuel valve actuator position and the compared demanded fuel flow and present fuel flow; and generating an valve effective area at the fuel valve based at least on the actual fuel valve actuator position.

In various embodiments, the operations further include obtaining, via the first pressure sensor, in which the first pressure value is upstream of the fuel valve; and obtaining, via the second pressure sensor, in which the second pressure value is downstream of the fuel valve. In one embodiment, determining the demanded fuel valve actuator position is further based on a delta pressure across the fuel valve. In another embodiment, obtaining the first pressure value upstream of the fuel valve is at the main fuel line.

In still various embodiments, the operations further include obtaining a compressor discharge pressure value. In one embodiment, determining the demanded fuel valve actuator position is further based on the compressor discharge pressure value.

In still yet various embodiments, the operations further include determining a physical area at the fuel valve based at least on a function of a physical property of the fuel valve and the valve effective area. In one embodiment, the physical property of the fuel valve comprises one or more of a slope, contour, or area of at the fuel valve. In another embodiment, determining the physical area at the fuel valve is further based on a delta pressure across the fuel valve based at least on a difference between the first pressure value and the second pressure value. In still another embodiment, determining the physical area at the fuel valve is further based on a compressor discharge pressure.

In one embodiment, generating the valve effective area at the fuel valve is further based at least on the actual actuator position at the fuel valve and a function of physical property of the fuel valve and delta pressure across the fuel valve.

In various embodiments, the operations further include operating the fuel valve based on the valve effective area. In one embodiment, the operations further include operating the fuel valve based on the valve effective area and further based on one or more of the specific gravity and the discharge coefficient of the fluid at the metering system.

Another aspect of the present disclosure is directed to a method for operating a combustion system of a turbo machine. The method includes determining a demanded fuel valve actuator position based at least on an estimated fuel valve actuator position and a demanded fuel flow; comparing the demanded fuel flow and a present fuel flow; determining an actual fuel valve actuator position based at least on the demanded fuel valve actuator position and the compared demanded fuel flow and present fuel flow; and generating an valve effective area at the fuel valve based at least on the actual fuel valve actuator position.

In one embodiment, the method further includes obtaining a first pressure value upstream of a fuel valve at a zone fuel line; obtaining a second pressure value downstream of the fuel valve; and determining the demanded fuel valve actuator position is further based on a delta pressure across the fuel valve.

In another embodiment, the method further includes obtaining a compressor discharge pressure value; and determining the demanded fuel valve actuator position is further based on the compressor discharge pressure value.

In various embodiments, the method further includes determining a physical area at the fuel valve based at least on a function of a physical property of the fuel valve and the valve effective area. In one embodiment, determining the physical area at the fuel valve is further based on a delta pressure across the fuel valve based at least on a difference between the first pressure value and the second pressure value. In one embodiment, determining the physical area at the fuel valve is further based on a compressor discharge pressure.

In one embodiment, generating the valve effective area at the fuel valve is further based at least on the actual actuator position at the fuel valve and a function of physical property of the fuel valve and delta pressure across the fuel valve.

Another aspect of the disclosure is directed to a fuel metering system including a main fuel line configured to provide a flow of fuel, a plurality of zone fuel lines each split from the main fuel line through which at least a portion of the flow of fuel is provided, a fuel valve disposed at each zone fuel line, wherein the fuel valve is configured to obtain and receive a present fuel valve area value and a present valve position value, a first pressure sensor disposed upstream of the fuel valve at the main fuel line, in which the first pressure sensor is configured to obtain a first pressure value, a second pressure sensor disposed downstream of each fuel valve, in which the second pressure sensor is configured to obtain a second pressure value at each zone fuel line, and a flow meter disposed downstream of the fuel valve at each zone fuel line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
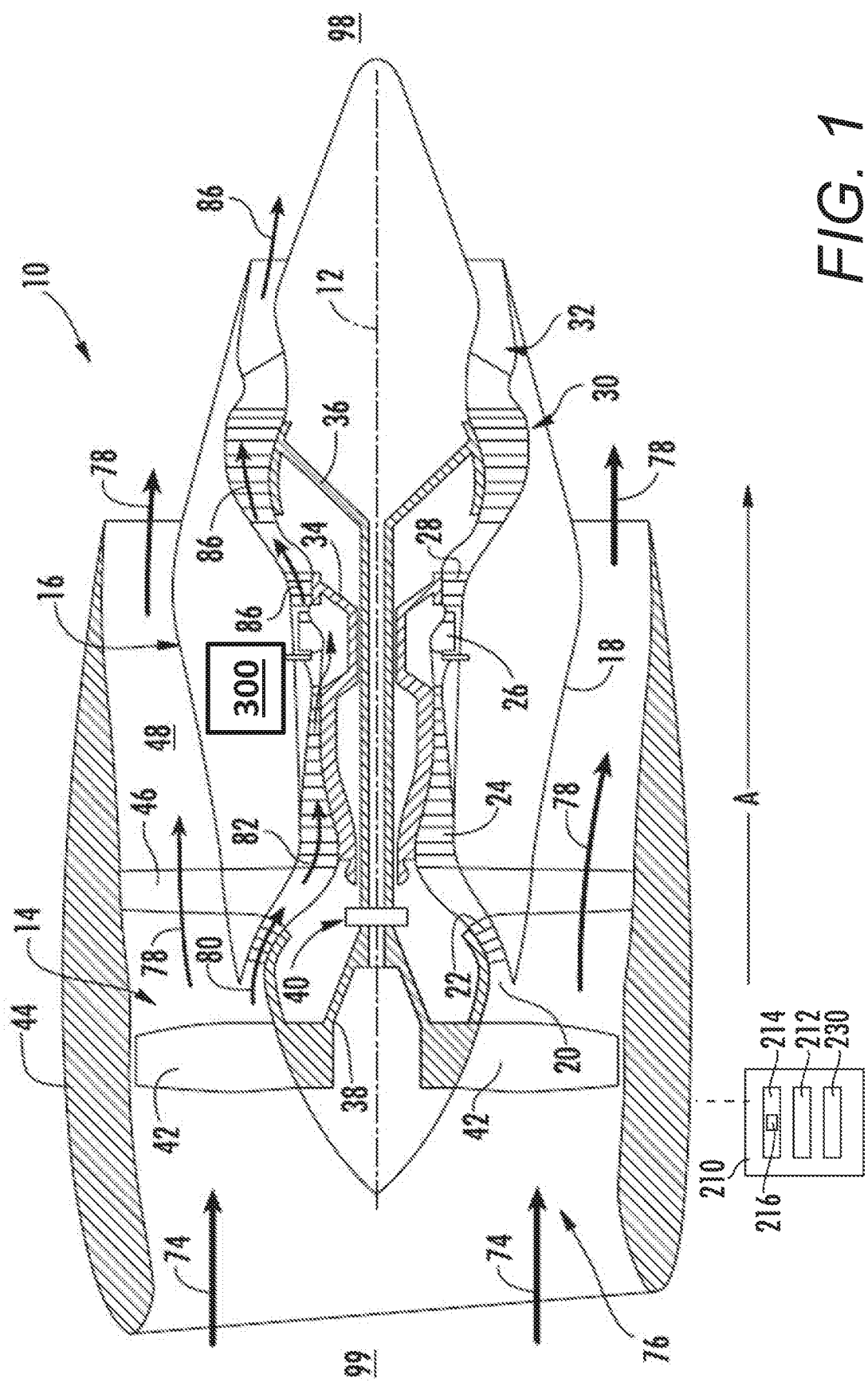
FIG. 1 is a schematic cross-sectional view of an exemplary embodiment of a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "upstream of" or "downstream of" generally refer to directions toward "upstream 99" or toward "downstream 98", respectively, as provided in the figures.

Embodiments of a fuel metering system and method for operation are generally provided herein that enable efficient and accurate multiple zone fuel splitting such as to reduce mechanical complexity, improve fuel metering accuracy, improve fuel pressure and flow flexibility, improve fuel flow and combustion dynamics, and reduce peak fuel system pressure and thermal profile. Embodiments of the fuel metering system provided herein may decrease total pressure drop in the fuel system, thereby decreasing maximum system pressure, and thereby decreasing fuel pump power requirement, engine efficiency and performance losses, and improving thermal efficiency. Additionally, embodiments of the fuel metering system provided herein may mitigate or remove requirements for certain pressure relationships between fuel manifolds (e.g., pressure relationships between the main fuel line and the split zone fuel lines, or between each split zone fuel line, etc.) for each fuel zone, thereby improving fueling flexibility and reducing mechanical complexity.

Embodiments of the fuel metering system and method for operation provided herein include delivering fuel from a fuel pump to a main fuel line via a shutoff valve therebetween. A first high-accuracy close-coupled high dynamic response pressure transducer is disposed at the main fuel line such as to measure main fuel line pressure. A servo-valve controlled fuel valve with position feedback is disposed at each split zone fuel line extended from the main fuel line. A second high-accuracy close-coupled high dynamic response pressure transducer is disposed downstream of the valve at each split zone fuel line such as to measure pressure at each split zone fuel line. A high accuracy, high dynamic response flow meter is disposed at each split zone fuel line downstream of each valve at each split zone fuel line.

The system includes a controller executing steps for a method for operation. A closed inner control loop controls valve position. An outer control loop compares a demanded fuel flow (e.g., from a pilot, cockpit, or other input, etc.) with a feedback signal from the flow meter. Integral control may be utilized to determine steady state error calculations. A variable control gain may be utilized proportional to an inverse of a function of at least a physical property of the fuel valve (e.g., physical slope of a contour of the fuel valve) and a pressure differential across the fuel valve (a delta pressure value from upstream and downstream of the fuel valve), such as to provide consistent dynamic response across a plurality of operating conditions (e.g., changes in fuel pressure, flow, temperature, etc. based at least on changes in operating condition of the engine).

The first pressure transducer (e.g., upstream of the fuel valve) and the second pressure transducer (e.g., downstream of the fuel valve) together provide the delta pressure value to a feed-forward function configured to determine a predicted fuel valve flow area and a fuel valve position based at least on the demanded fuel flow. The feed-forward function enables high dynamic response to rapid changes in demanded fuel flow and rapid fuel reduction with sufficient tracking during engine stalls or blow outs.

The fuel metering system and method for operation further provides via the feed-forward function a backup fail operation that reverts the fuel system to a conventional system accuracy if one or more flow meters fails or is otherwise inoperable. The fuel metering system and method for operation further provides via the closed outer control loop a reduced reversionary bandwidth level if one or more pressure transducers fails or is otherwise inoperable. Still further, the fuel metering system and method for operation provides a further reduced reversionary bandwidth level if one or more fuel valve positioning feedback functions fails or is otherwise inoperable.

In still another embodiment, a reduced accuracy feed-forward function may utilize compressor discharge pressure or a predetermined table, chart, model, function, etc. to minimize adverse impacts to bandwidth due to failure or inoperability at one or more of the pressure transducers.

It should be appreciated that various embodiments of the fuel metering system and method for operation shown and described herein may be utilized with a liquid or gaseous fluid generally, or combinations thereof, including a fuel, oil or oil-based fluid, or lubricant or hydraulic fluid generally. As such, various embodiments of the fuel metering system and method for operation may be utilized for lubricant or hydraulic systems for engines generally.

Referring now to the drawings, FIG. 1 is a schematic partially cross-sectioned side view of an exemplary heat engine 10 herein referred to as "engine 10" as may incorporate various embodiments of the present disclosure. Although further described below with reference to a turbofan engine, the present disclosure is also applicable to heat engines, propulsion systems, and turbomachinery in general, including turbofan, turbojet, turboprop, turboshaft, and propfan gas turbine engines, marine and industrial turbine engines, and auxiliary power units. As shown in FIG. 1, the engine 10 has a longitudinal or axial centerline axis 12 that extends there through for reference purposes and generally along an axial direction A. The engine 10 further defines an upstream end 99 and a downstream 98 generally opposite of the upstream end 99 along the axial direction A. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
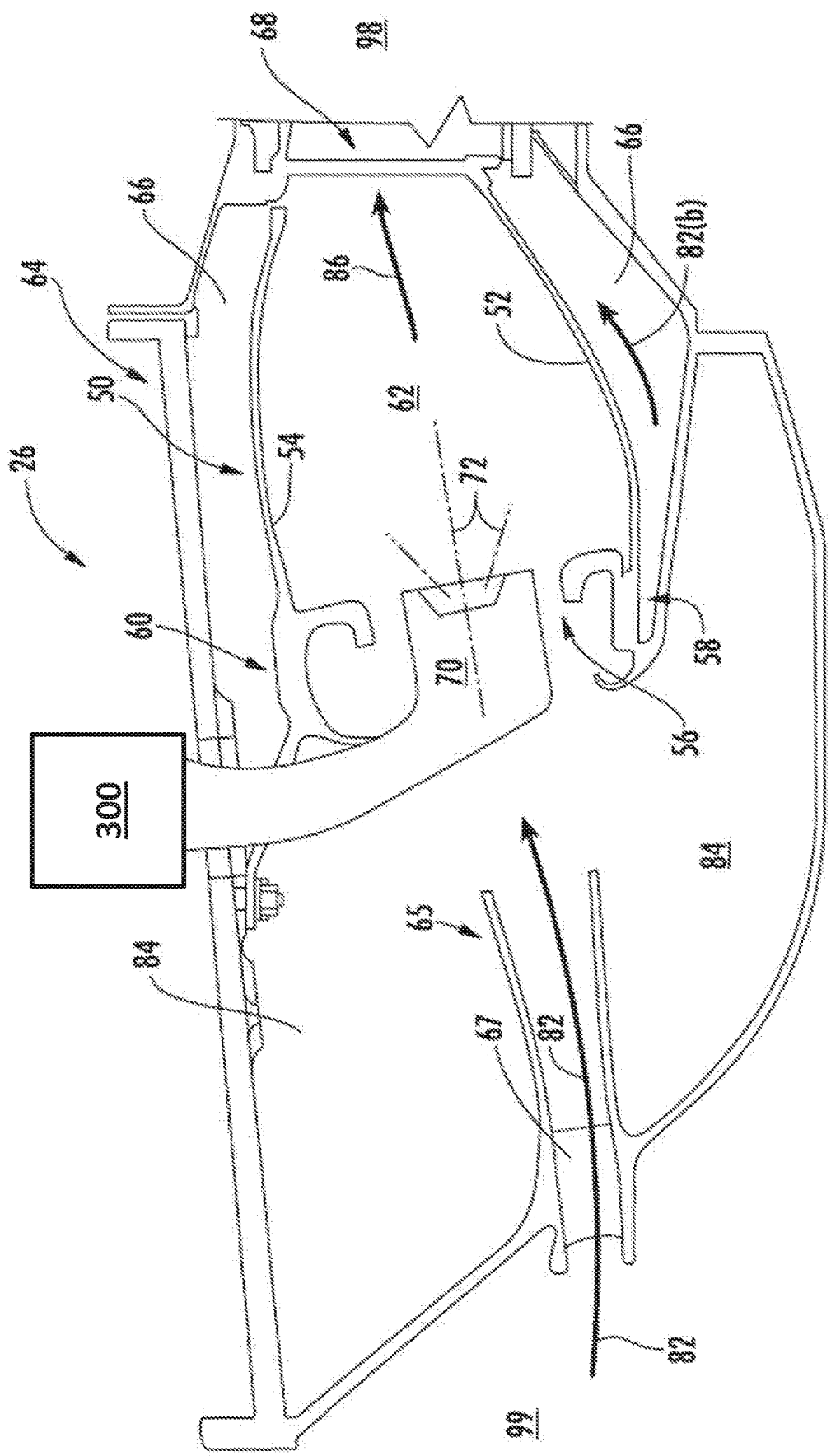
FIG. 2 is a cross sectional side view of an exemplary embodiment of a combustor assembly of the gas turbine engine generally provided in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a dome wall 56 that extends radially between upstream ends 58, 60 of the inner liner 52 and the outer liner 54 respectfully. In other embodiments of the combustion section 26, the combustion assembly 50 may be a multi-annular combustor, such as a can or can-annular type. As shown in FIG. 2, the inner liner 52 is radially spaced from the outer liner 54 with respect to axial centerline 12 (FIG. 1) and defines a generally annular combustion chamber 62 therebetween. However, it should be appreciated that the liners 52, 54, swirlers (not shown), or other components may be disposed from the axial centerline 12 such as to define a multi-annular combustor configuration.

As shown in FIG. 2, the inner liner 52 and the outer liner 54 may be encased within an outer casing 64. An outer flow passage 66 may be defined around the inner liner 52, the outer liner 54, or both. The inner liner 52 and the outer liner 54 may extend from the dome wall 56 towards a turbine nozzle or inlet 68 to the HP turbine 28 (FIG. 1), thus at least partially defining a hot gas path between the combustor assembly 50 and the HP turbine 28. A fuel injector assembly 70 may extend at least partially through the dome wall 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel injector assembly 70. The compressed air 82 pressurizes the diffuser cavity 84. The compressed air 82 enters the fuel injector assembly 70 to mix with a liquid and/or gaseous fuel.

Referring still to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

As the fuel-air mixture burns, pressure oscillations occur within the combustion chamber 62. In known engines, these pressure oscillations may be driven, at least in part, by a coupling between the flame's unsteady heat release dynamics, the overall acoustics of the combustor 50, transient fluid dynamics within the fuel system and the combustor 50, insufficient fuel system control response rate or accuracy, insufficient fuel flow metering across multiple combustion zones, or combinations thereof. The pressure oscillations generally result in undesirable high-amplitude, self-sustaining pressure oscillations within the combustor 50. These pressure oscillations may result in intense single-frequency or multiple-frequency dominated acoustic waves that may propagate within the generally closed combustion section 26.

Depending, at least in part, on the operating condition of the engine 10 and combustor 50, these pressure oscillations may generate acoustic waves at a multitude of low or high frequencies. These acoustic waves may propagate downstream from the combustion chamber 62 towards the high pressure turbine 28 and/or upstream from the combustion chamber 62 back towards the diffuser cavity 84 and/or the outlet of the HP compressor 24. In particular, as previously provided, low frequency acoustic waves, such as those that occur during engine startup and/or during a low power to idle operating condition, and/or higher frequency waves, which may occur at other operating conditions, may reduce operability margin of the turbofan engine and/or may increase external combustion noise or vibration.

It should be appreciated that the engine 10 may include a plurality of fuel nozzles 70 defining two or more independent zones through which various rates of fuel or fuel-air mixture 72 are provided therethrough. Based on one or more of desired pressure oscillations (or attenuation thereof), power or thrust outputs, emissions outputs, or other functions of desired heat release characteristics, vibrations, and/or thrust outputs, fuel is metered or otherwise flowed differently through two or more sections or zones of the fuel nozzles 70. As such, the engine 10 may generally include two or more fuel nozzles 70 outputting different flow rates, pressures, etc. of fuel.

Referring back to FIG. 1, the engine 10 and fuel metering system 300 may further include a controller 210 configured to determine fuel flow to the fuel nozzles 70 and operating the engine 10. In various embodiments, the controller 210 can generally correspond to any suitable processor-based device, including one or more computing devices. For instance, FIG. 1 illustrates one embodiment of suitable components that can be included within the controller 210.

As shown in FIG. 1, the controller 210 can include a processor 212 and associated memory 214 configured to perform a variety of computer-implemented functions. In various embodiments, the controller 210 may be configured to operate the fuel metering system 300 shown and described herein and such as according to one or more steps of the method 1000 described in regard to FIGS. 7-8.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. For example, the control logic 216 may define firmware configured to execute instructions for determining an effective area at a fuel valve to output the fuel flow to the combustion section 26 for a minimum-valve fuel system for multi-zone combustors. The control logic 216 may include instructions that when executed by the one or more processors 212 cause the one or more processors 212 to perform operations, such as steps of a method for operating the fuel metering system 300 and the engine 10 (hereinafter, "method 1000") outlined in regard to FIGS. 7-8 and further described in regard to the engine 10 and fuel metering system 300 shown and depicted in FIGS. 1-5.

In various embodiments, the controller 210 may include at the memory 214 a predetermined table, chart, schedule, function, transfer or feedback function, etc. of compressor discharge pressure or to minimize adverse impacts to bandwidth due to failure or inoperability at one or more pressure transducers.

Additionally, as shown in FIG. 1, the controller 210 may also include a communications interface module 230. In various embodiments, the communications interface module 230 can include associated electronic circuitry (e.g., interface circuitry) that is used to send and receive data. As such, the communications interface module 230 of the controller 210 can be used to receive data from the engine 10 and the fuel metering system 300, such as, but not limited to, fuel pressure from the fuel pump, fuel valve position, fuel pressure from the pressure transducers, or fuel flow from the flow meters, etc. The communications interface module 230 may particularly send and receive data to and from the control logic 216 stored in the memory 214. The communications interface module 230 may still particularly send and receive signals to and from one or more fuel valves 320 of the fuel metering system 300, such as described further herein and in regard to method 1000.

In addition, the communications interface module 230 can also be used to communicate with any other suitable components of the fuel metering system 300 or the engine 10, such as to receive data or send commands to/from any number of valves (e.g., fuel valve 320), flow meters (e.g., flow meter 330), transducers (e.g., sensors 315, 325), pumps (e.g., pump system 310), etc. controlling one or more pressures, flow rates, temperatures, speeds, etc. at the fuel metering system 300 (FIGS. 3-6) and the engine 10.

It should be appreciated that the communications interface module 230 can be any combination of suitable wired and/or wireless communications interfaces and, thus, can be communicatively coupled to one or more components of the fuel metering system 300 via a wired and/or wireless connection. As such, the controller 210 may operate, modulate, control, or adjust operation of the engine 10 and the fuel metering system 300, such as to modulate fuel pressure or flow from the fuel pump to one or more split zone fuel lines further described herein, and operation of the engine 10 generally based at least on the demanded fuel flow corresponding to a desired engine output (e.g., output thrust, engine pressure ratio, etc.).

Figure 3:
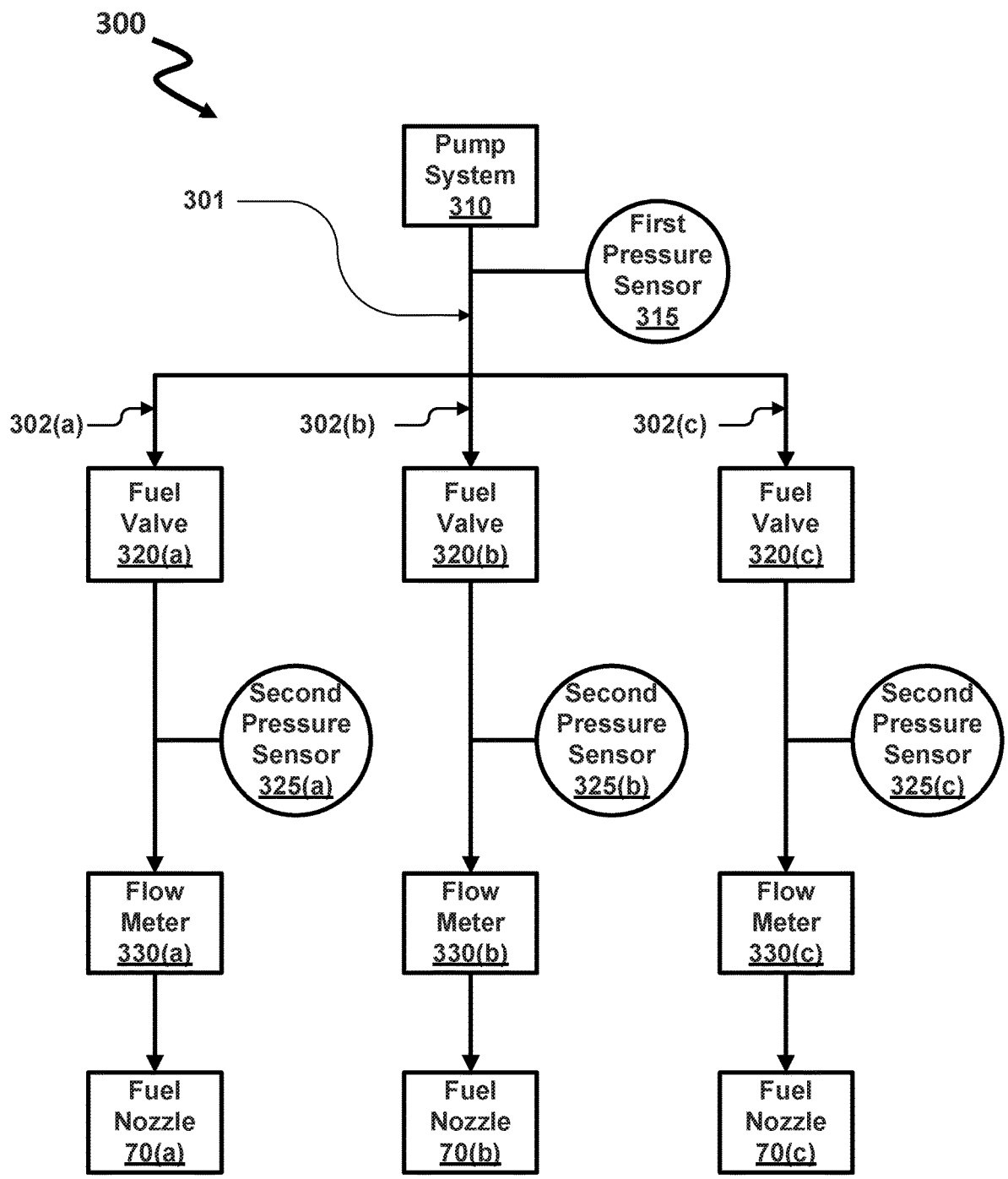
FIGS. 3-6 are schematic views of embodiments of a metering system of the engine and combustor assembly of FIGS. 1-2 according to aspects of the present disclosure.
Figure 4:
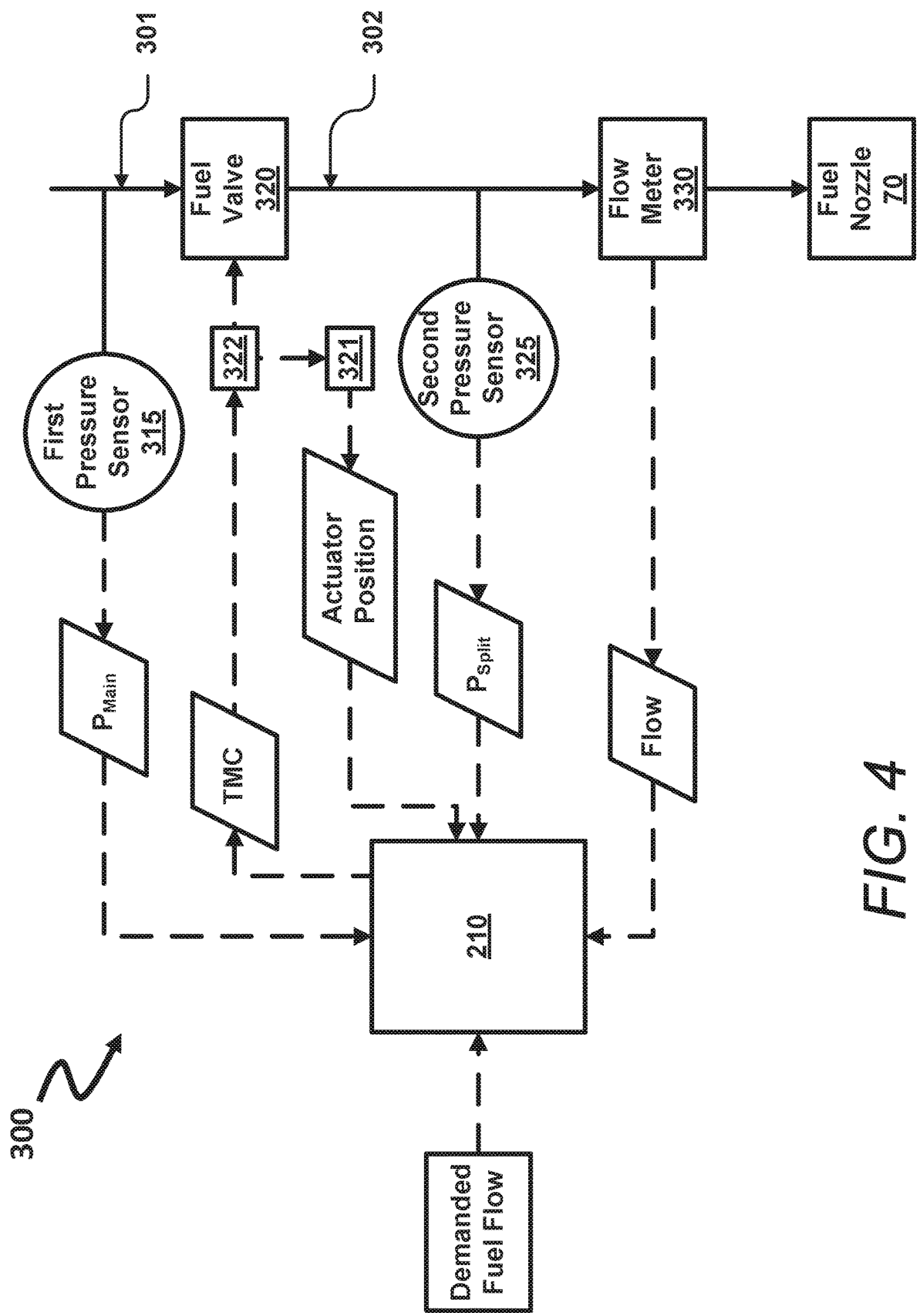

Referring now to FIGS. 3-4, exemplary schematics of the fuel metering system 300 of the engine 10 are generally provided. The fuel metering system 300 includes a pump system 310 (FIG. 3) delivering fluid (e.g., liquid and/or gaseous fuel) via a main line 301 split to a zone fuel line 302 (FIG. 4), or more particularly a plurality of zone fuel lines 302(*a*), 302(*b*), 302(*c*), such as depicted in regard to FIG. 3. Each zone fuel line 302, 302(*a*), 302(*b*), 302(*c*) corresponds to a combustion zone at the combustion section 26 such as to provide fuel flow rates, output thrusts, combustion dynamics, and other combustion characteristics different from one another. Each zone fuel line 302(*a*), 302(*b*), 302(*c*) provides the flow of fluid such as to improve blow out performance, attenuate combustion pressure oscillations (e.g., to control dynamic heat release via differences in fuel flow and fuel/air ratio at the combustion section 26), and to improve combustion characteristics at a plurality of operating conditions of the engine 10 (e.g., light off, ground idle, take-off, climb, cruise, flight idle, approach, reverse, conditions, or one or more conditions therebetween, or generally part-load or full-load conditions and transient conditions therebetween).

In various embodiments, the pump system 310 may define a centrifugal pump, a positive displacement pump, or any other pump or fluid displacement system appropriate for providing fuel through the main line 301 and zone fuel lines 302. In still various embodiments, the pump system 310 includes a shutoff valve or other appropriate overspeed protection system. Alternatively, a separate shutoff valve or overspeed protection system may be disposed between the pump system 310 and the main fuel line 301 and each zone fuel line 302.

It should be appreciated that although three zone fuel lines 302(*a*), 302(*b*), 302(*c*) are depicted in regard to FIG. 3, the fuel metering system 300 may include a plurality of zone fuel lines 302 (e.g., two or more). Still further, embodiments of the fuel metering system 300 provided herein improve multi-zone fuel metering systems generally for multi-zone combustion systems, such as to enable operation of greater quantities of fuel zones without subsequent deteriorations in efficiency, mechanical complexity, pressure differential, etc.

Referring still to FIGS. 3-4, a first pressure sensor 315 is disposed at the main fuel line 301 such as to measure pressure at the main fuel line 301. As such, the first pressure sensor 315 obtains an overall fluid pressure reading at the main fuel line 301, such as indicated as $P_{Main}$ in FIGS. 4-6, before the fuel flow splits to each zone fuel line 302. In various embodiments, the first pressure sensor 315 defines a high-accuracy strain gage pressure sensor, a piezoresistive pressure sensor, a capacitive pressure sensor, a quartz mechanical or resonant pressure sensor, a resonant pressure sensor generally, or close-coupled high dynamic response pressure transducer generally. In one embodiment, the first pressure sensor 315 may include a trench etched resonant pressure sensor (TERPS).

A fuel valve 320 is disposed at each zone fuel line 302, such as depicted at FIG. 4, or further depicted in regard FIG. 3 at fuel valves 320(*a*), 320(*b*), 320(*c*) at each respective zone fuel line 302(*a*), 302(*b*), 302(*c*). The fuel valve 320 may include a servo-valve controlled fuel valve with position feedback. In various embodiments, the fuel valve 320 includes a valve positioning unit (FIGS. 5-6) configured to receive and transmit signals and actuate one or more valves, actuators, or other flow or pressure control devices to output a desired pressure or flow rate of fluid through the zone fuel line 302. In one embodiment, the valve positioning unit includes a control valve 322 controlling a pressure or flow rate of fluid through the zone fuel line 302. For example, the control valve 322 may include an electrohydraulic servo valve (EHSV) to control pressure or flow rate of fluid to an actuator assembly of the fuel valve 320. However, in other embodiments, the control valve 322 may include any suitable type control mechanism for the fuel valve 320.

The valve positioning unit (FIGS. 5-6) may further include a position transducer 321 such as to convert motion or position to a signal, or to receive a signal such as to move the fuel valve 320 to desired position, thereby adjusting fuel flow rate or pressure through the zone fuel line 302. For example, the position transducer 321 may include a differential transformer generally, or a variable differential transformer more particularly, such as a linear variable differential transformer (LVDT) configured to receive desired valve position signals, adjust the fuel valve 320 position based on the received signal, and transmit a present valve position signal of the fuel valve 320 to the controller 210 (FIG. 4).

Figure 5:
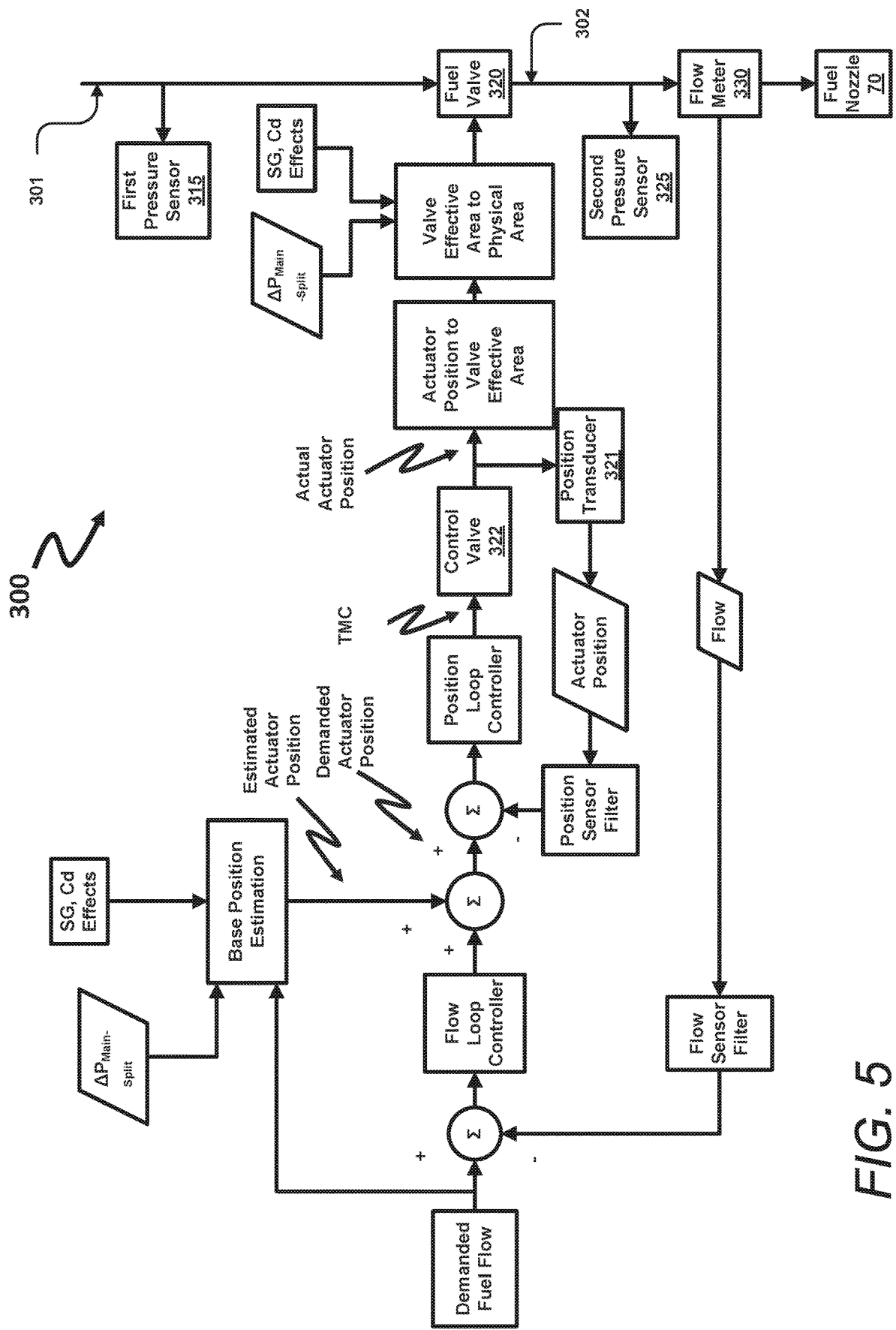

Regarding FIGS. 4-5, the fuel valve 320 including the position transducer 321 and control valve 322 measures, receives, obtains, and transmits a present base position estimation (e.g., from the valve position transducer 321). Additionally, as further described herein, a demanded actuator position is determined from the estimated base valve position and an output from a flow loop controller determining a difference between demanded fuel flow and actual or present fuel flow.

Referring still to FIGS. 4-5, the controller 210 (FIG. 4) may generally include a Position Loop Controller and a Flow Loop Controller, such as depicted in regard to FIG. 5. The controller 210 may further determine estimated actuator position and demanded actuator position and receive an actual actuator position such as further described herein in regard to FIG. 5 and method 1000. The controller 210 may further still transmit a torque motor command (TMC) or other control signal to the valve positioning unit including one or more of the position transducer 321 and control valve 322 (FIG. 4) to provide the actual actuator position. The controller 210 still further may determine the physical area of at the fuel valve 320 based at least on a valve effective area $A_{valve}$ corresponding to the actual actuator position. As such, the controller 210 may receive or determine the estimated actuator position, determine the demanded actuator position to produce the actual actuator position corresponding to a desired valve effective area $A_{valve}$, and convert the valve effective area $A_{valve}$ to the actual physical valve area at the fuel valve 320 such as to output the actual fuel flow through each fuel nozzle 70 of the combustion section 26.

Referring to FIGS. 3-4, a second pressure sensor 325 is disposed downstream of the fuel valve 320 at each split zone fuel line 302 such as to measure pressure of fluid at each split zone fuel line 302. Referring to FIG. 3, each zone fuel line 302(a), 302(b), 302(c) includes a respective second pressure sensor 325(a), 325(b), 325(c) measuring fluid pressure downstream of each respective fuel valve 320(a), 320(b), 320(c), such as to obtain a pressure measurement at each respective zone fuel line 302, indicated as $P_{split}$ in FIG. 4. In various embodiments, the second pressure sensor 325 may define a high-accuracy close-coupled high dynamic response pressure transducer such as described in regard to the first pressure sensor 315.

Referring still to FIGS. 3-4, a flow meter 330 is disposed at each split zone fuel line 302 downstream of each fuel valve 320. Referring to FIG. 3, each zone fuel line 302(a), 302(b), 302(c) includes a respective flow meter 330(a), 330(b), 330(c) measuring fluid flow rate at each respective zone fuel line 302 downstream of each respective fuel valve 320(a), 320(b), 320(c), indicated as "flow" in FIGS. 4-5. In various embodiments, the flow meter 330 includes a high accuracy, high dynamic response flow meter. For example, the flow meter 330 may include an ultrasonic flow meter configured to obtain a measurement of fuel flow via ultrasound. In various embodiments, the flow meter 330 may particularly obtain a volumetric flow rate of fluid through each respective zone fuel line 302 downstream of each fuel valve 320. In other embodiments, the flow meter 330 may obtain a mass flow rate of the fluid through each respective zone fuel line 302.

Referring now to FIGS. 4-5, the fuel metering system 300 provides an actual fuel flow through each fuel nozzle 70 corresponding to each split zone fuel line 302 (e.g., one or more fuel nozzles 70(a), 70(b), 70(c) each corresponding to respective zone fuel lines 302(a), 302(b), 302(c) depicted in FIG. 3). The actual fuel flow is determined based at least on a closed inner control loop controlling valve position at the fuel valve 320, such as depicted at "Position Loop Controller" in FIG. 5. An outer control loop compares a demanded fuel flow (e.g., demanded fuel flow from a pilot, cockpit, operator, or other input, etc.) with a feedback flow signal from the flow meter 330.

Referring to FIG. 5, in various embodiments, the Position Loop Controller and a Flow Loop Controller may each define one or more of a proportional, integral derivative controller. In one embodiment, an integral control may be utilized to determine steady state error calculations. A variable control gain may be utilized proportional to an inverse of a function of at least a physical property of the fuel valve 320, such as physical area or slope of a contour of the fuel valve 320, fuel valve area, etc., versus a pressure differential across the fuel valve 320, such as obtained by at least a delta pressure value upstream and downstream of the fuel valve 320. More particularly, the delta pressure value ($\Delta P_{Main-Split}$) is determined at least by a difference in obtained pressure measurements from the first pressure sensor 315 ($P_{main}$) at the main fuel line 301 (e.g., a first pressure value) and from the respective second pressure sensor 325 ($P_{split}$) at the respective zone fuel line 302 (e.g., a second pressure value). The delta pressure valve may further be defined by a square root of the difference in the first pressure value (e.g., $P_{main}$) and the second pressure value (e.g., $P_{split}$).

It should be appreciated that a respective $P_{split}$, flow, $A_{valve}$, physical area, and estimated, demanded, and actual actuator position or valve position corresponds to each zone fuel line 302 (e.g., 302(a), 302(b), 302(c), etc.), such as to determine actual fuel flow relative to the one or more fuel nozzles 70 corresponding to each zone fuel line 302. The variable control gain may generally provide consistent dynamic response across a plurality of operating conditions of the engine 10, such as relative to one or more operating conditions (e.g., light off, idle, take-off, climb, cruise, approach, reverse, or transient conditions therebetween, or one or more part-load conditions or full load conditions, or transient conditions therebetween), or changes in air or fuel flow rate, pressure, temperature, density, etc. based at least on changes in operating conditions of the engine 10.

A feed-forward function, depicted as the Base Position Estimation, is configured to provide an estimated actuator position at the fuel valve 320 based at least on the demanded fuel flow and the delta pressure value ($\Delta P_{Main-Split}$) from at least the first pressure sensor 315 and the second pressure sensor 325, such as depicted in regard to FIG. 5. The feed-forward function providing the Base Position Estimation at the fuel valve 320 may further include one or more specific gravity and/or discharge coefficients of the fluid when determining the Base Position Estimation. The feed-forward function enables high dynamic response to rapid changes in demanded fuel flow and rapid fuel reduction with sufficient tracking during engine stalls or blow outs.

Referring still to FIG. 5, the Base Position Estimation, a difference in the demanded fuel flow versus the measured fuel flow from the flow meter (flow), and the Flow Loop Controller together provide input to the Position Loop Controller via a Demanded Actuator Position at the fuel valve 320. For example, the Flow Loop Controller, such as including one or more variable or proportional, integral, derivative controllers, and the Base Position Estimation together determine, at least in part, a Demanded Actuator Position signal. The Demanded Actuator Position provides input to the Position Loop Controller, in addition to Actual Actuator Position from the Position Transducer (e.g., position transducer 321 in FIG. 4) and feedback from the Control Valve (e.g., control valve 322 in FIG. 4) to output an Actual Actuator Position at the fuel valve 320. Stated alternatively, the Actual Actuator Position may be a function at the Position Loop Controller of at least the Demanded Actuator Position and the difference in Demanded Fuel flow and Actual Fuel Flow (Flow). In various embodiments, a sensor filter, such as depicted at the Flow Sensor Filter and the Position Sensor Filter, is further included, such as a lead lag or other error calculation, compensation, etc.

The Actual Actuator Position is further correlated to the valve effective area $A_{valve}$ at the fuel valve 320. For example, the valve effective area $A_{valve}$ may be a function of the Actual Actuator Position (e.g., a linear position from the position transducer 321). The valve effective area $A_{valve}$ is then converted to physical area at the fuel valve 320 such as based on one or more physical properties of the fuel valve 320, such as physical area, contour, slope, etc. In various embodiments, the physical area at the fuel valve 320 is further compared with the delta pressure value ($\Delta P_{Main-split}$), the specific gravity and/or discharge coefficients, to determine the actual fuel flow through the fuel nozzle(s) 70 of each zone fuel line 302.

Figure 6:
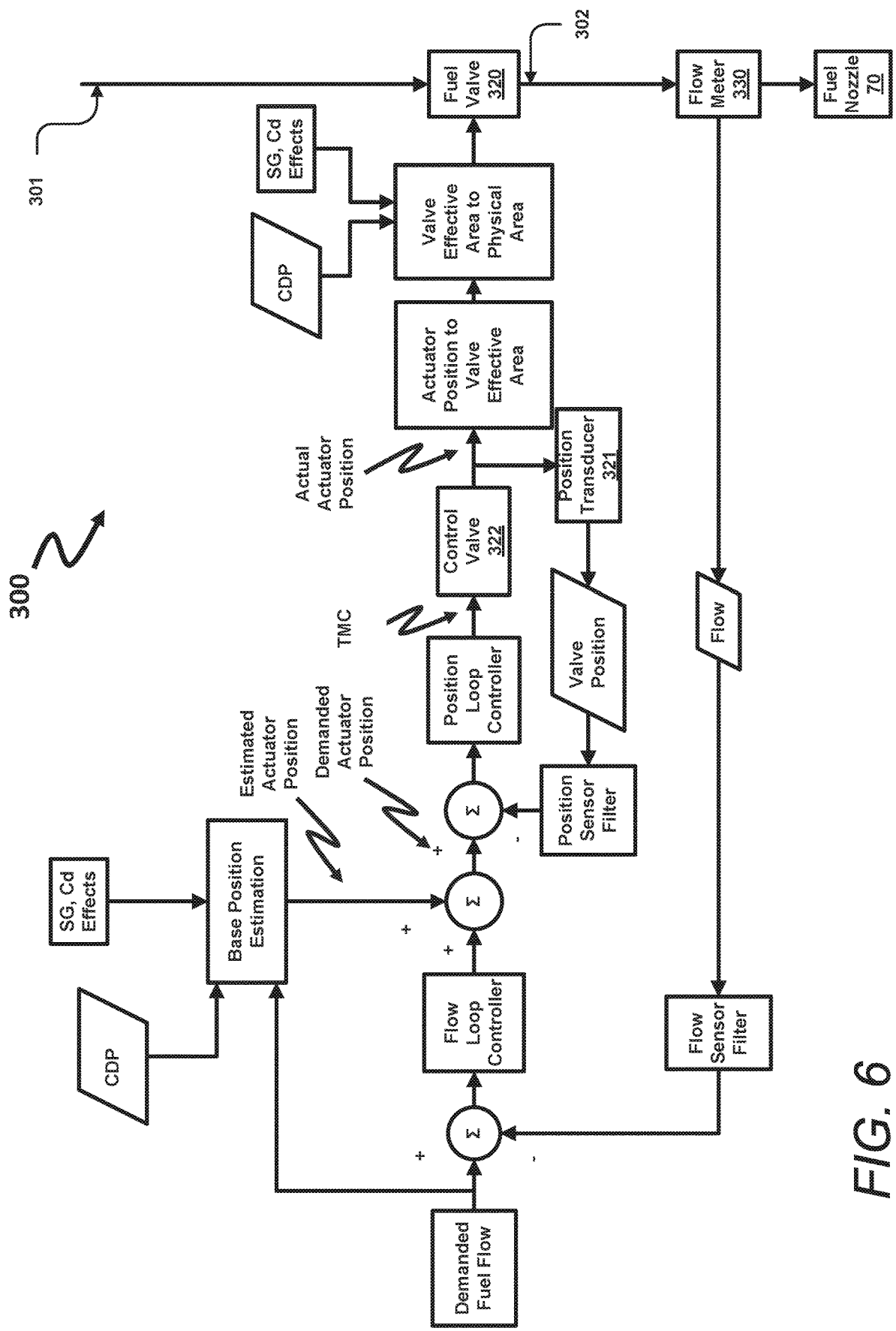

Referring briefly to FIG. 6, the exemplary schematic may be configured substantially similarly as described in regard to FIGS. 3-5. In regard to FIG. 6, in various embodiments, the controller 210 (FIG. 4) may receive and store at the memory 214 a compressor discharge pressure (CDP) value from the compressor section (e.g., one or more of compressors 22, 24), or a predetermined table, chart, model, function, etc. to minimize adverse impacts to bandwidth due to failure or inoperability at one or more of the pressure sensors 315, 325.

Figure 7:
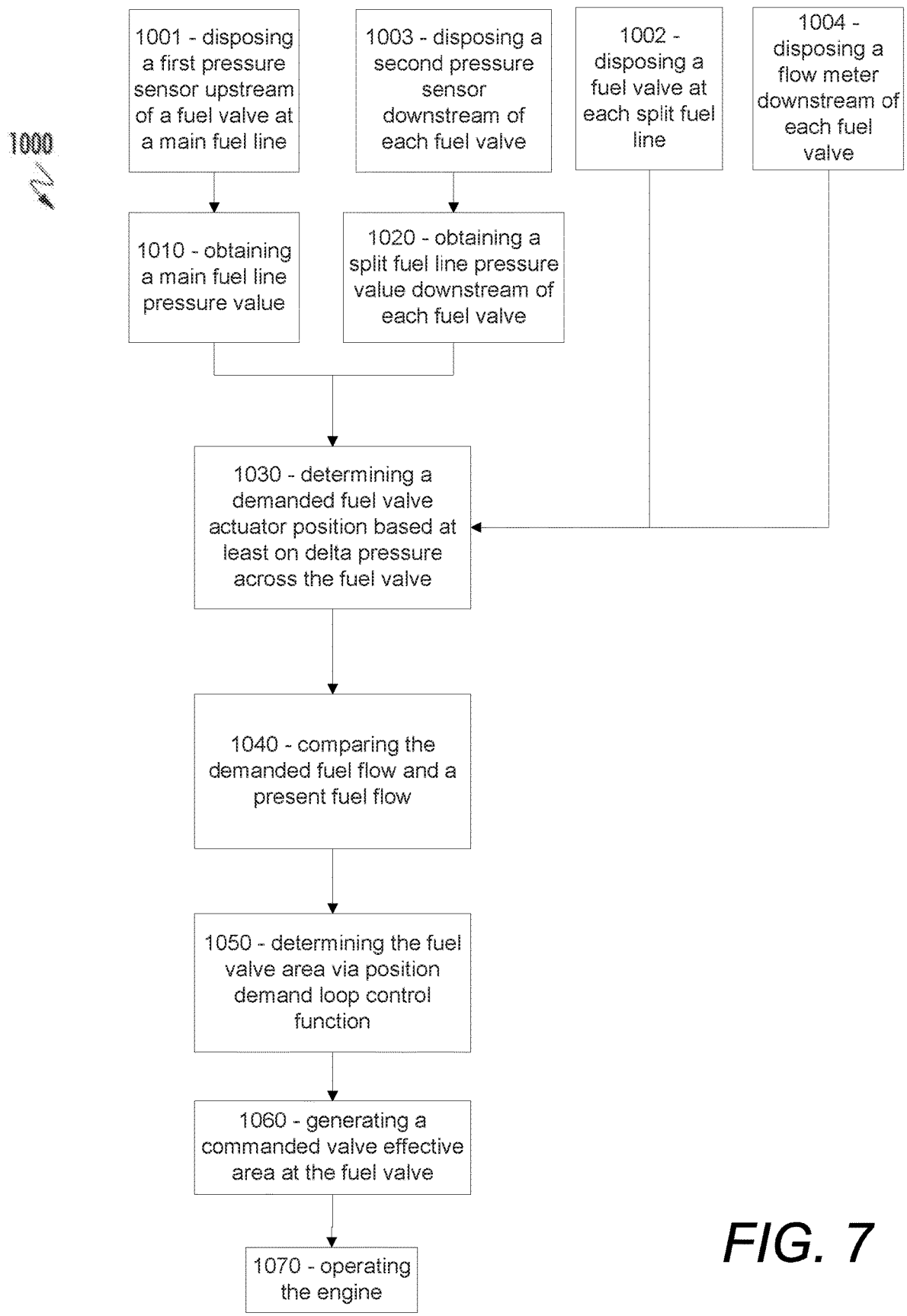
FIG. 7 is a flow chart outlining steps of a method for operating a fuel metering system and engine according to aspects of the present disclosure.
Figure 8:
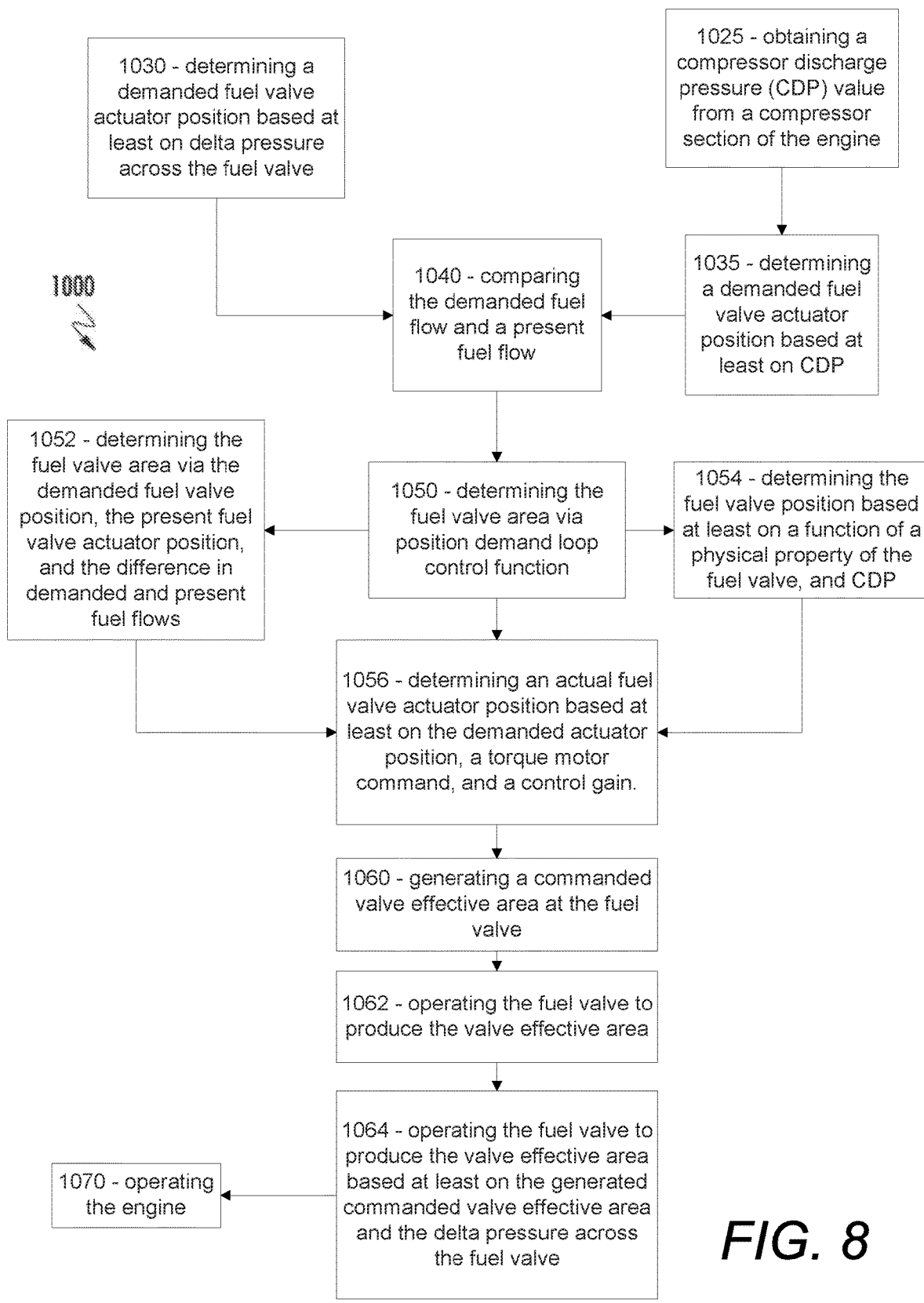
FIG. 8 is a flow chart outlining steps of a method for operating a fuel metering system and engine according to aspects of the present disclosure.

Referring now to FIGS. 7-8, exemplary flow charts depicting steps of a method for operating an engine including embodiments of a fuel metering system such as described in regard to FIGS. 1-6 are generally provided (hereinafter, "method 1000").

The method 1000 may include at 1001 disposing or positioning a first pressure sensor upstream of a fuel valve at a main fuel line; at 1002 disposing or positioning a fuel valve at each split fuel line extended from the main fuel line; at 1003 disposing or positioning a second pressure sensor downstream of each fuel valve at each split fuel line; and at 1004 disposing or positioning a flow meter downstream of each fuel valve at each split fuel line. In various embodiments, the method 1000 at 1002 includes extending each split fuel line in parallel relative to one another and in serial arrangement extended from the main fuel line.

The method 1000 includes at 1010 obtaining a main fuel line pressure value. In various embodiments, the method 1000 at 1010 more particularly obtains the main fuel line pressure via the first pressure sensor at the main fuel line upstream of each split fuel line. In one embodiment, the method 1000 at 1010 more particularly obtains the main fuel line pressure upstream of the fuel valve of each split fuel line.

The method 1000 further includes at 1020 obtaining a split fuel line pressure value downstream of each fuel valve relative to each split fuel line, such as described in regard to FIGS. 1-6.

In various embodiments, the method 1000 may further include at 1025 obtaining a compressor discharge pressure (CDP) value from a compressor section of the engine.

The method 1000 further includes at 1030 determining a demanded fuel valve actuator position based at least on a present or estimated fuel valve actuator position (e.g., via a differential transducer), an actual actuator position, a demanded fuel flow, and a delta pressure across the fuel valve based at least on a difference between the obtained main fuel line pressure and split fuel line pressure. In one embodiment, the method 1000 at 1030 further includes determining the estimated fuel valve actuator position based on one or more of a specific gravity and/or discharge coefficient of the fluid at the main fuel line.

In various embodiments, the method 1000 further includes at 1035 determining a demanded fuel valve actuator position based at least on a present or estimated fuel valve actuator position (e.g., via a differential transducer), an actual actuator position, a demanded fuel flow, and the CDP. In one embodiment, the method 1000 at 1035 further includes determining the estimated fuel valve actuator position based on one or more of a specific gravity and/or discharge coefficient of the fluid at the main fuel line.

The method 1000 further includes at 1040 comparing the demanded fuel flow and a present or actual fuel flow. In one embodiment, comparing the demanded fuel flow (e.g., via an operator, pilot, cockpit, controller, etc.) and the present fuel flow (e.g., via the flow meter) further includes at 1042 determining a difference in demanded fuel flow and the present or actual fuel flow. In still various embodiments, determining a difference in demanded fuel flow and the present fuel flow further includes applying a sensor filter, such as a lead lag or other error calculation or compensation.

The method 1000 further includes at 1050 determining the fuel valve area via position demand loop control function. Determining the fuel valve area is based at least on the compared fuel flow and the demanded fuel valve actuator position. In one embodiment, the method 1000 further includes at 1052 determining the fuel valve area via the demanded fuel valve position, the present or actual fuel valve actuator position, and the difference in demanded fuel flow and present fuel flow. In still another embodiment, determining the fuel valve area is further based on the position demand including a control gain (e.g., variable or proportional, integral, derivative). In one embodiment, determining the fuel valve area is based at least on a function of a physical property of the fuel valve (e.g., slope, contour, area, etc.) and the delta pressure across the fuel valve (e.g., $\Delta P_{Main-split}$). In another embodiment, the method 1000 further includes at 1054 determining the fuel valve position based at least on a function of a physical property of the fuel valve (e.g., slope, contour, area, etc.) and a compressor discharge pressure (CDP).

In yet another embodiment, the method 1000 further includes at 1056 determining an actual fuel valve actuator position based at least on the demanded actuator position, a torque motor command, and a control gain.

The method 1000 further includes at 1060 generating a commanded valve effective area at the fuel valve based on the actual actuator position. The method 1000 may further include at 1062 operating the fuel valve to produce the valve effective area based at least on the generated commanded valve effective area. In various embodiments, the method 1000 may further include at 1064 operating the fuel valve to produce the valve effective area based at least on the generated commanded valve effective area and the delta pressure across the fuel valve. In still various embodiments, the method 1000 at 1064 may further include operating the fuel valve to produce the valve effective area based on one or more of the specific gravity and the discharge coefficient of the fluid at the metering system.

In various embodiments, the method 1000 further includes at 1070 operating the engine based at least on the generated effective fuel valve area at the fuel valve, such as to provide the demanded fuel flow through the one or more fuel nozzles of each split zone fuel line at the combustion section such as to improve engine responses, including, but not limited to, attenuate undesired combustion dynamics, improve blow out margin, improve transient fuel and air flow operability, and improve engine efficiency.

It should be appreciated that embodiments of the fuel metering system and method shown and described herein provide systems and methods for improved fuel system control and measurement accuracy such as to improve engine responses, including, but not limited to, improved combustion dynamics, improved blow out margin, improved transient operability, and improved engine efficiency, such as described herein. As such, various embodiments of the method and fuel metering system provided herein provide specific computer functions, operations, or steps, and improvements to computer-related technology, via improved measurement accuracy, bandwidth, and response, and improvements to engine control and operation via such improvements in computer-related technology. Such specific method steps, functions, or operations implemented via computer-related technology enable solving problems related to known single or multi-zone fuel metering systems, and engine structure and engine operation to which known single and multi-zone fuel metering systems are implemented.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbo machine comprising a metering system for a combustion section, the turbo machine comprising:
   a main fuel line configured to provide a flow of fuel;
   a zone fuel line split from the main fuel line through which at least a portion of the flow of fuel is provided;
   a fuel valve disposed at the zone fuel line, wherein the fuel valve is configured to obtain and receive a present fuel valve area value and a present valve position value;
   a first pressure sensor disposed upstream of the fuel valve, wherein the first pressure sensor is configured to obtain a first pressure value;
   a second pressure sensor disposed downstream of the fuel valve, wherein the second pressure sensor is configured to obtain a second pressure value;
   a flow meter disposed downstream of the fuel valve; and
   a controller including a flow loop controller and a position loop controller configured to perform operations, the operations comprising:
      determining, via the flow loop controller, a demanded fuel valve actuator position based at least on an estimated fuel valve actuator position and a demanded fuel flow;
      comparing, via the flow loop controller, the demanded fuel flow and a present fuel flow;
      determining, via the position loop controller, an actual fuel valve actuator position based at least on the demanded fuel valve actuator position and the comparing of the demanded fuel flow and the present fuel flow; and
      generating, via the position loop controller, a valve effective area at the fuel valve based at least on the actual fuel valve actuator position.

2. The turbo machine of claim 1, further comprising:
   obtaining, via the first pressure sensor, the first pressure value upstream of the fuel valve; and
   obtaining, via the second pressure sensor, the second pressure value downstream of the fuel valve.

3. The turbo machine of claim 2, wherein determining the demanded fuel valve actuator position is further based on a delta pressure across the fuel valve.

4. The turbo machine of claim 2, wherein obtaining the first pressure value upstream of the fuel valve is at the main fuel line.

5. The turbo machine of claim 1, the operations further comprising:
   obtaining a compressor discharge pressure value.

6. The turbo machine of claim 5, wherein determining the demanded fuel valve actuator position is further based on the compressor discharge pressure value.

7. The turbo machine of claim 1, the operations further comprising:
   determining a physical area at the fuel valve based at least on a function of a physical property of the fuel valve and the valve effective area.

8. The turbo machine of claim 7, wherein the physical property of the fuel valve comprises one or more of a slope, contour, or area of at the fuel valve.

9. The turbo machine of claim 7, wherein determining the physical area at the fuel valve is further based on a delta pressure across the fuel valve based at least on a difference between the first pressure value and the second pressure value.

10. The turbo machine of claim 7, wherein determining the physical area at the fuel valve is further based on a compressor discharge pressure.

11. The turbo machine of claim 1, wherein generating the valve effective area at the fuel valve is further based at least on the actual fuel valve actuator position at the fuel valve and a function of physical property of the fuel valve and delta pressure across the fuel valve.

12. The turbo machine of claim 1, the operations further comprising:
   operating the fuel valve based on the valve effective area.

13. The turbo machine of claim 12, the operations further comprising:
   operating the fuel valve based on the valve effective area and further based on one or more of a specific gravity and a discharge coefficient of the fuel at the metering system.

14. A method for operating a combustion system of a turbo machine, the combustion system comprising:
   a main fuel line configured to provide a flow of fuel;
   a zone fuel line split from the main fuel line through which at least a portion of the flow of fuel is provided;
   a fuel valve disposed at the zone fuel line, wherein the fuel valve is configured to obtain and receive a present fuel valve area value and a present valve position value;
   a first pressure sensor disposed upstream of the fuel valve, wherein the first pressure sensor is configured to obtain a first pressure value;
   a second pressure sensor disposed downstream of the fuel valve, wherein the second pressure sensor is configured to obtain a second pressure value;
   a flow meter disposed downstream of the fuel valve; and
   a controller including a flow loop controller and a position loop controller configured to perform the method, the method comprising:
      determining, via the flow loop controller, a demanded fuel valve actuator position based at least on an estimated fuel valve actuator position and a demanded fuel flow;
      comparing, via the flow loop controller, the demanded fuel flow and a present fuel flow;
      determining, via the position loop controller, an actual fuel valve actuator position based at least on the demanded fuel valve actuator position and the compared demanded fuel flow and present fuel flow; and
      generating, via the position loop controller, a valve effective area at the fuel valve based at least on the actual fuel valve actuator position.

15. The method of claim 14, the method further comprising:
   obtaining a first pressure value upstream of a fuel valve at a zone fuel line;
   obtaining a second pressure value downstream of the fuel valve; and
   determining the demanded fuel valve actuator position is further based on a delta pressure across the fuel valve.

16. The method of claim 14, the method further comprising:
   obtaining a compressor discharge pressure value; and
   determining the demanded fuel valve actuator position is further based on the compressor discharge pressure value.

17. The method of claim 14, the method further comprising:
   determining a physical area at the fuel valve based at least on a function of a physical property of the fuel valve and the valve effective area.

18. The method of claim 17, determining the physical area at the fuel valve is further based on a delta pressure across the fuel valve based at least on a difference between a first pressure value and a second pressure value, wherein the first pressure value is obtained upstream of a fuel valve at a zone fuel line and the second pressure value is obtained downstream of the fuel valve.

19. The method of claim 17, wherein determining the physical area at the fuel valve is further based on a compressor discharge pressure.

20. A fuel metering system, the system comprising:
a main fuel line configured to provide a flow of fuel;
a plurality of zone fuel lines each split from the main fuel line through which at least a portion of the flow of fuel is provided;
a fuel valve disposed at each zone fuel line, wherein the fuel valve is configured to obtain and receive a present fuel valve area value and a present valve position value;
a first pressure sensor disposed upstream of the fuel valve at the main fuel line, wherein the first pressure sensor is configured to obtain a first pressure value;
a second pressure sensor disposed downstream of each fuel valve, wherein the second pressure sensor is configured to obtain a second pressure value at each zone fuel line;
a flow meter disposed downstream of the fuel valve at each zone fuel line; and
a controller including a flow loop controller and a position loop controller configured to perform operations:
determining, via the flow loop controller, a demanded fuel valve actuator position based at least on an estimated fuel valve actuator position and a demanded fuel flow;
comparing, via the flow loop controller, the demanded fuel flow and a present fuel flow;
determining, via the position loop controller, an actual fuel valve actuator position based at least on the demanded fuel valve actuator position and the compared demanded fuel flow and present fuel flow; and
generating, via the position loop controller, a valve effective area at the fuel valve based at least on the actual fuel valve actuator position.

* * * * *